United States Patent
Hayakawa

(10) Patent No.: US 9,552,238 B2
(45) Date of Patent: Jan. 24, 2017

(54) INFORMATION PROCESSING APPARATUS, INFORMATION PROCESSING METHOD AND COMPUTER-READABLE STORAGE MEDIUM

(71) Applicant: CANON KABUSHIKI KAISHA, Tokyo (JP)

(72) Inventor: Mizuki Hayakawa, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 6 days.

(21) Appl. No.: 14/541,915

(22) Filed: Nov. 14, 2014

(65) Prior Publication Data
US 2015/0169390 A1   Jun. 18, 2015

(30) Foreign Application Priority Data
Dec. 18, 2013   (JP) .................. 2013-261830

(51) Int. Cl.
*G06F 9/54* (2006.01)
(52) U.S. Cl.
CPC ..................... *G06F 9/542* (2013.01)
(58) Field of Classification Search
CPC ...................................................... G06F 9/542
See application file for complete search history.

(56) References Cited

U.S. PATENT DOCUMENTS

| | | | | |
|---|---|---|---|---|
| 7,036,047 B1 * | 4/2006 | Yu | .................. | G06F 3/1209 358/1.14 |
| 2001/0025324 A1 * | 9/2001 | Gamo | .................. | G06F 9/465 719/315 |
| 2003/0177448 A1 * | 9/2003 | Levine | .................. | H04N 1/00127 715/201 |
| 2007/0106999 A1 * | 5/2007 | Zhang | .................. | G06F 9/3851 719/323 |

FOREIGN PATENT DOCUMENTS

JP   10-275223 A   10/1998

OTHER PUBLICATIONS

U.S. Appl. No. 14/477,462, filed Sep. 4, 2014.

* cited by examiner

*Primary Examiner* — Syed Roni
(74) *Attorney, Agent, or Firm* — Fitzpatrick, Cella, Harper & Scinto

(57) ABSTRACT

It is determined whether a data source can handle an event that an application that operates on an OS (Operating System) receives via a predetermined API. If it is determined that the data source cannot handle the event, the event necessary for the operation of the data source is acquired from the OS.

15 Claims, 5 Drawing Sheets

F I G. 1
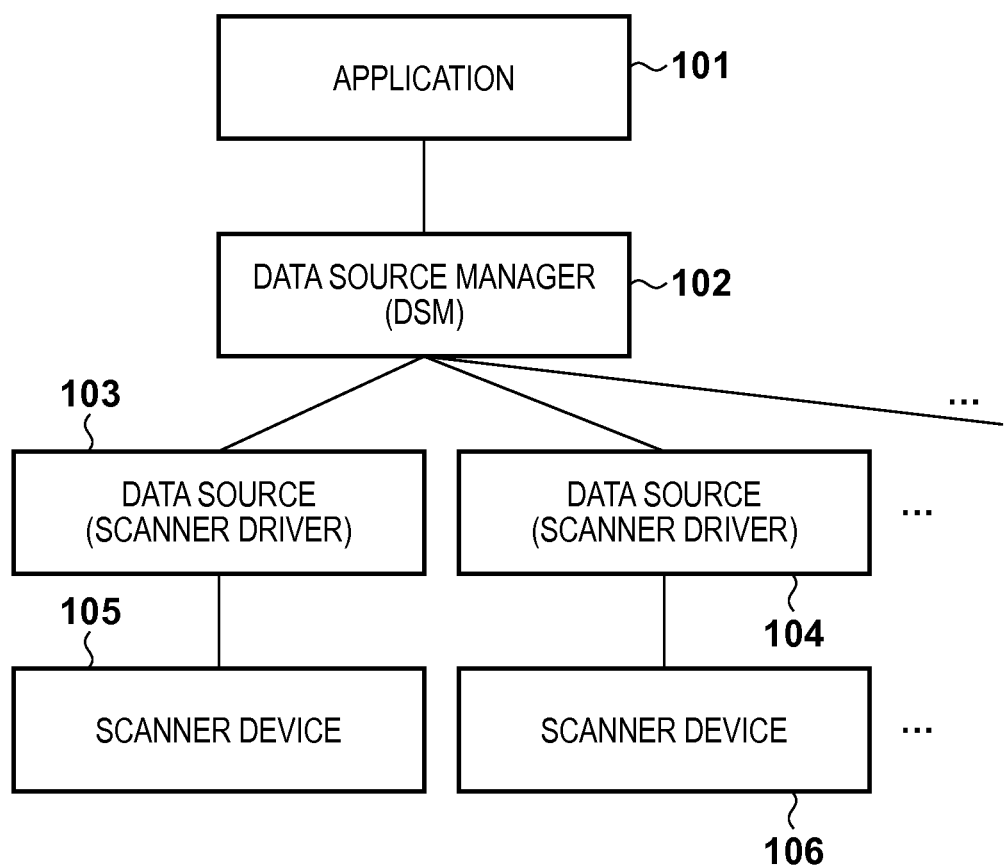

INFORMATION PROCESSING APPARATUS, INFORMATION PROCESSING METHOD AND COMPUTER-READABLE STORAGE MEDIUM

BACKGROUND OF THE INVENTION

Field of the Invention

The present invention relates to an information processing technique using an application that operates on an OS (Operating System) and a data source that is a driver configured to control a peripheral device.

Description of the Related Art

There is conventionally known TWAIN that is an interface standard (API) used to control a data source such as a scanner driver from an application (see Japanese Patent Laid-Open No. 10-275223). In this case, the application needs to do event handling via the TWAIN.

Recently, however, in the execution environment of a programming language or framework that does not make a user aware of event handling and is becoming quite common, it is difficult to implement a program corresponding to the existing TWAIN, and the programming knowledge of the conventional C/C++ language or conventional execution environment is necessary. In particular, it is difficult to do implementation according to a restriction that event handling needs to be performed in the same thread. This problem may also arise in an API other than TWAIN.

The present invention provides an information processing technique capable of easily normally operating a data source from an application in accordance with a predetermined API.

SUMMARY OF THE INVENTION

In order to achieve the above object, an information processing apparatus according to the present invention has the following arrangement.

An information processing apparatus for causing an application that operates on an OS (Operating System) and a data source that is a driver configured to control a peripheral device to communicate via a predetermined API (Application Programming Interface), comprising: a determination unit configured to determine whether the data source can handle an event that the application receives via the API; and an acquisition unit configured to, when the determination unit determines that the data source cannot handle the event, acquire the event necessary for an operation of the data source from the OS.

According to the present invention, it is possible to easily normally operate a data source from an application in accordance with a predetermined API.

Further features of the present invention will become apparent from the following description of exemplary embodiments with reference to the attached drawings.

BRIEF DESCRIPTION OF THE DRAWINGS

FIG. 1 is a block diagram showing a TWAIN configuration according to the first embodiment;

DESCRIPTION OF THE EMBODIMENTS

Figure 2:
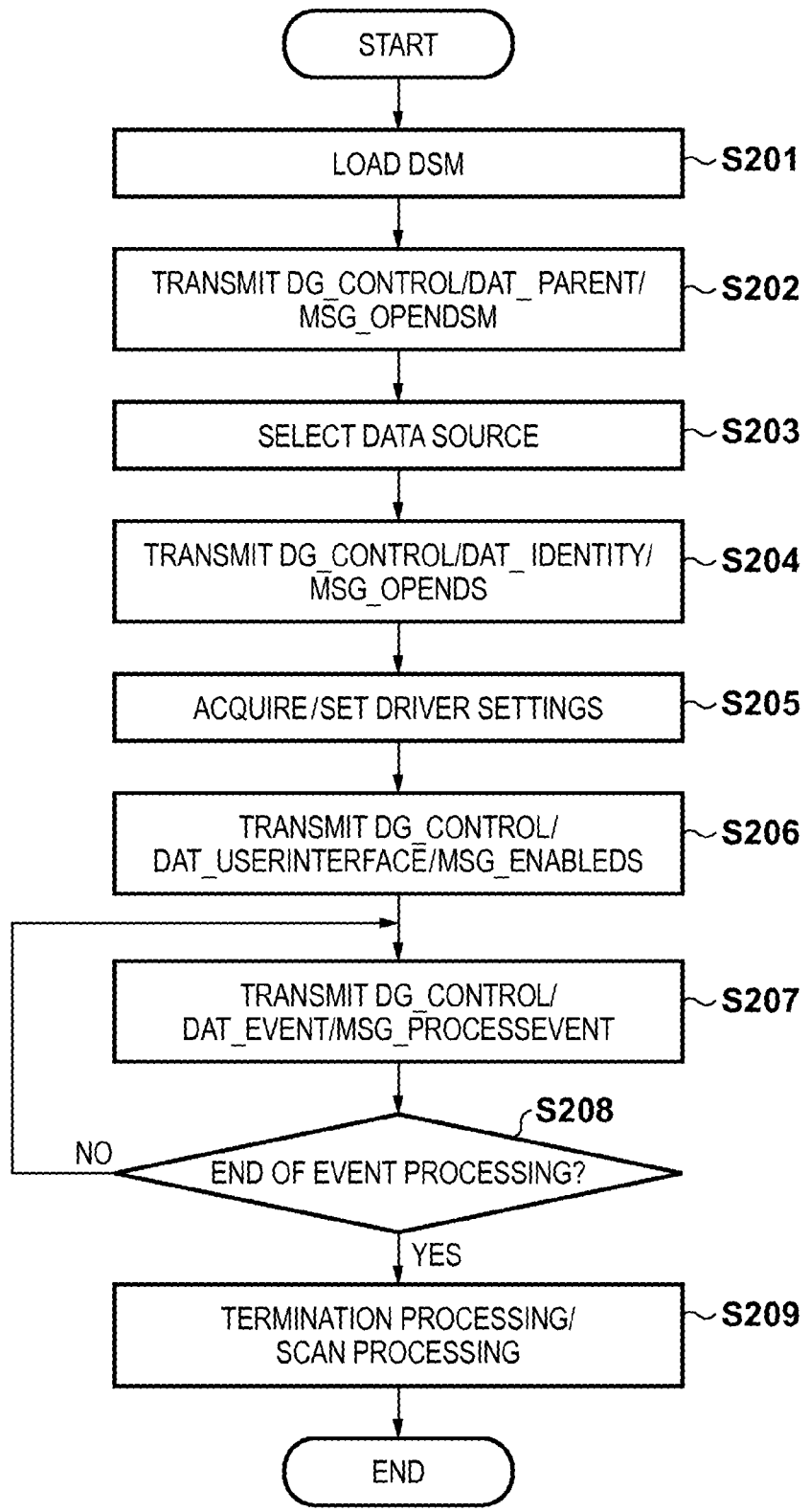
FIG. 2 is a flowchart showing processing on the side of an application according to the first embodiment.

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<First Embodiment>

FIG. 1 is a block diagram showing the arrangement of a system corresponding to a TWAIN standard.

An application 101 accesses a data source manager 102 (to be referred to as a DSM hereinafter) defined by a TWAIN standard that is one of APIs (Application Programming Interfaces). The DSM 102 is preinstalled in an OS (Operating System) corresponding to the TWAIN standard, for example, Windows® that is an OS. A plurality of data sources 103 and 104 that are scanner data sources (scanner drivers) can be connected to the DSM 102. The data sources 103 and 104 control corresponding scanner devices 105 and 106, respectively. The scanner device 105 reads an image on an original document and transfers thus obtained image data to the data source 103 under the control of the data source 103. The data source 103 supplies the received image data to the application 101. The scanner device 106 is controlled by the data source 104 and performs similar processing. The application 101 selects a scanner device (data source) and acquires read image data obtained by the scanner device.

Each of the application 101, the DSM 102, and the data sources 103 and 104 is software (program) that operates on the OS.

The DSM 102 accesses the data sources 103 and 104, and transmits a command according to a TWAIN protocol transmitted from the application 101 to a selected data source, for example, the data source 103 when the data source 103 is selected. Because of this configuration, even in an environment where a plurality of data sources are installed, the application 101 can selectively access the plurality of data sources by accessing the DSM 102. The DSM 102 has a function of listing UIs (User Interfaces) to be used by the application 101 to select the data sources 103 and 104 or listing the installed data sources 103 and 104.

Note that the application 101, the DSM 102, and the data sources 103 and 104 are installed in an information processing apparatus such as a general-purpose computer. The information processing apparatus includes standard constituent elements (for example, CPU, RAM, ROM, hard disk, external storage device, network interface, display, keyboard, mouse, and the like) included in a general-purpose computer. The CPU of the information processing apparatus reads out programs stored in a memory (RAM or ROM) and executes them, thereby implementing the application 101, the DSM 102, and the data sources 103 and 104. These programs are stored in, for example, a storage device such as a hard disk. The information processing apparatus is connected to the scanner devices 105 and 106 via an external interface such as a USB interface and communicates with them.

Devices connected to the information processing apparatus are not limited to the scanner devices 105 and 106, and peripheral devices (multi function peripheral, digital camera, video camera, and the like) capable of operating based on the TWAIN standard can be connected. On each device connected to the information processing apparatus, various kinds of operations such as function execution and setting for the device can be implemented via a UI displayed on the display unit (display) of the information processing apparatus.

In this embodiment, the TWAIN standard has been exemplified as the interface standard used to control the data source from the application. However, the present invention is not limited to this. Any other API standard is usable as long as it is a predetermined interface (API) that makes the same behavior as the TWAIN standard.

The operation of the application when displaying the UI of the data source 103 and reading an image will be described next with reference to the flowchart shown in FIG. 2.

Note that the processing of FIG. 2 is implemented by causing the CPU to read out the application 101 stored in the memory and execute it.

In step S201, the application 101 loads the DSM 102. In step S202, the application 101 transmits a command "DG_CONTROL/DAT_PARENT/MSG_OPENDSM" according to the TWAIN protocol to the DSM 102 to make it open. In step S203, the application 101 selects the data source of the scanner device to be caused to read an image and notifies the DSM 102 of it. As the data source, the data source 103 or 104 shown in FIG. 1 is usable. For example, assume that the data source 103 is selected. A description will be made below using an example in which the data source 103 is selected.

In step S204, the application 101 transmits a command "DG_CONTROL/DAT_IDENTITY/MSG_OPENDS" according to the TWAIN protocol to the DSM 102 to connect the data source 103. In step S205, the application 101 transmits, to the DSM 102, a capability to acquire device information from the data source 103 or set information in the data source 103. In step S206, the application 101 transmits a command "DG_CONTROL/DAT_USERINTERFACE/MSG_ENABLEDS" according to the TWAIN protocol to the DSM 102 to enable the data source 103 (display the UI of the data source (scanner driver)).

In step S207, the application 101 acquires an event using an OS function (API of the OS) "GetMessage/PeekMessage". The application 101 adds the acquired event to a command "DG_CONTROL/DAT_EVENT/MSG_PROCESSEVENT" according to the TWAIN protocol and transmits it to the DSM 102.

In step S208, the application 101 checks the return value of the command "DG_CONTROL/DAT_EVENT/MSG_PROCESSEVENT" according to the TWAIN protocol. Event processing (processing according to the contents of the event) of the acquired event is performed on the side of the application 101. Accordingly, the process advances to termination processing or scan (image reading) processing of the data source 103. Here, the application 101 determines whether event processing has ended. If the event processing has not ended (NO in step S208), the process returns to step S207. If the event processing has ended (YES in step S208), the process advances to step S209. In step S209, the application 101 executes processing such as termination processing or scan processing in accordance with the state of the event.

Since the above-described procedure is a general procedure defined by TWAIN, any special processing need not be performed on the side of the application 101.

As the next operation, each command according to the TWAIN protocol which is transmitted from the application 101 to the DSM 102 needs to be transmitted from the DSM 102 to the data source 103. However, each command transmitted to the DSM 102 from step S203 is directly transmitted from the DSM 102 to the data source 103 selected in step S202, and a description of exchange between the DSM 102 and the data source 103 will be omitted.

The operation on the side of the data source 103 will be described with reference to the flowchart shown in FIG. 3.

Figure 3:
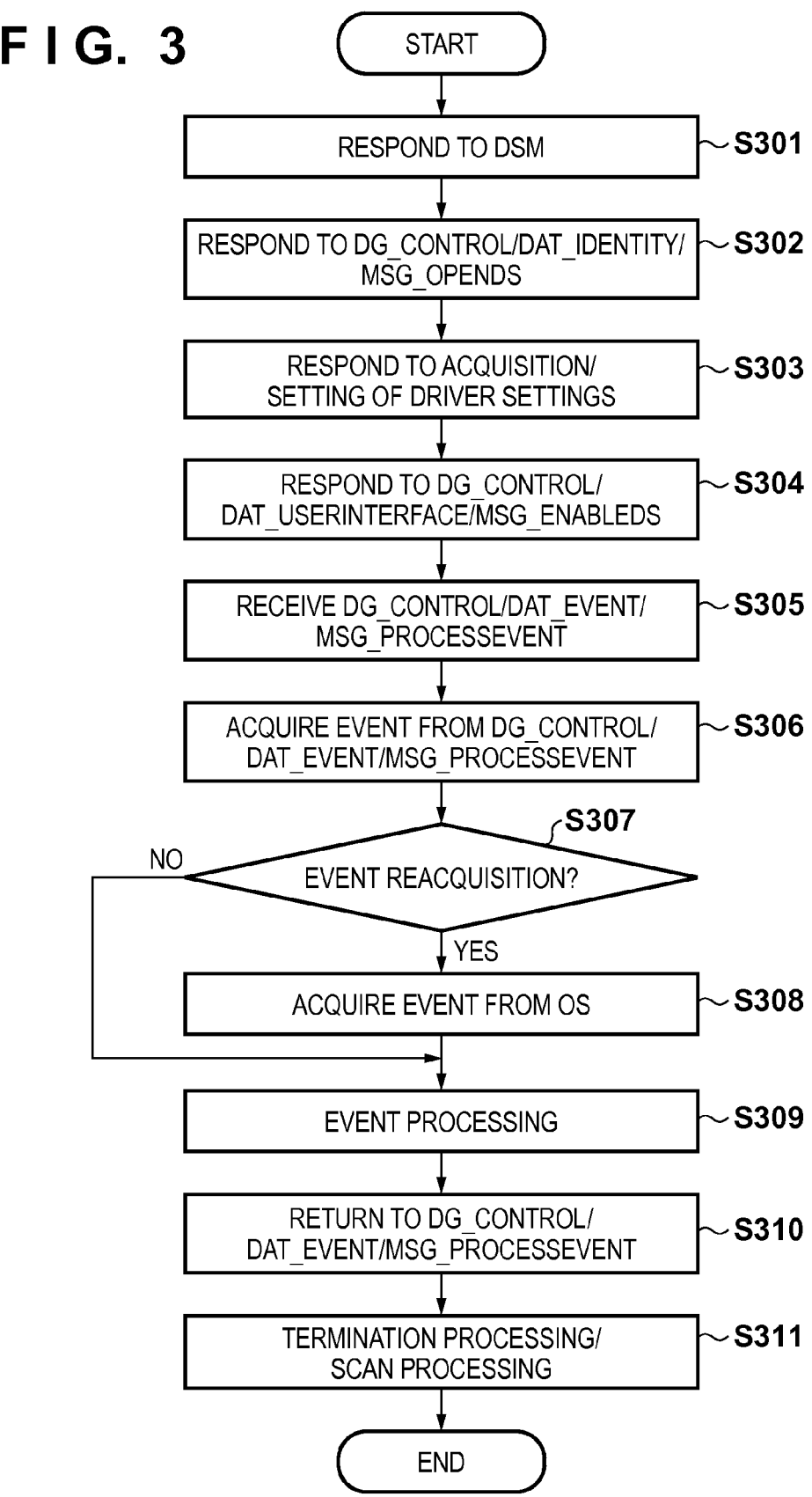
FIG. 3 is a flowchart showing processing on the side of a data source according to the first embodiment.

Note that the processing of FIG. 3 starts when the application 101 instructs image reading by the scanner device.

Here, a case where the data source 103 executes the processing as a data source will be exemplified. This also applies to the data source 104.

In step S301, the data source 103 responds to a data source list request from the DSM 102. With this response, the side of the application 101 is notified of the presence of the data source. In step S302, the data source 103 responds to the command "DG_CONTROL/DAT_IDENTITY/MSG_OPENDS" according to the TWAIN protocol. Initialization processing of software or initialization processing of the device is performed here.

In step S303, the data source 103 responds to the data source setting acquisition/setting transmitted from the DSM 102. The current set value or a set value transmitted from the application 101, for example, the color mode, resolution, and the like for reading are set. In step S304, the data source 103 responds to the command "DG_CONTROL/DAT_USERINTERFACE/MSG_ENABLEDS" according to the TWAIN protocol. Here, the data source 103 displays the UI of its own using the Window function or drawing command of the OS.

In step S305, the data source 103 receives the command "DG_CONTROL/DAT_EVENT/MSG_PROCESSEVENT" according to the TWAIN protocol. In step S306, the data source 103 acquires an event from the command "DG_CONTROL/DAT_EVENT/MSG_PROCESSEVENT" according to the TWAIN protocol.

In step S307, the data source 103 determines whether the acquired event needs to be reacquired. If the event is acquired from a correct message queue in step S306, event reacquisition is unnecessary. If the event is acquired from an incorrect (unintended) message queue, event reacquisition is necessary. The TWAIN does not take a multithread into consideration and cannot handle an event from the message queue of a different thread.

As the determination method here, for example, a thread ID obtained from the event using a GetWindowThreadProcessId( ) command that is an OS API is compared with the thread ID of the data source 103 obtained using a GetCurrentThreadProcessId( ) command that is an OS API as well. The thread IDs are represented by integer values and can therefore be compared. If the IDs are the same as the result of comparison, it is determined that event reacquisition is unnecessary. If the IDs are different, it is determined that event reacquisition is necessary.

As another determination method, a window handle representing a window in which the event has occurred is extracted from the event. If the event has occurred from a really existing window using an IsWindow( ) command that is an OS API, it is determined that event reacquisition is unnecessary. If the event has not occurred from a really existing window, it is determined that event reacquisition is necessary.

As still another determination method, a window handle is acquired from the event. If the window handle has a NULL value (representing an invalid window), it is determined that event reacquisition is necessary because the event impedes the operation of the data source.

Upon determining that the event needs to be reacquired (YES in step S307), the process advances to step S308. If no event need be reacquired (NO in step S307), the process advances to step S309.

In step S308, the data source 103 discards event information added to the command "DG_CONTROL/DAT_EVENT/MSG_PROCESSEVENT" according to the TWAIN protocol and acquires the event using the OS function. In step S309, the data source 103 processes the event. The window handle of the event that has occurred is added to the event information. For this reason, the window including a button and the like managed by the data source 103 can be determined, and the data source 103 performs necessary event processing.

In step S310, the data source 103 transmits the presence/absence of execution of event processing or the result of a change in the data source operation caused by the result of event processing to the DSM 102 as a response to the command "DG_CONTROL/DAT_EVENT/MSG_PROCESSEVENT" according to the TWAIN protocol.

In step S311, the data source 103 executes processing such as termination processing or scan processing.

If the application 101 has acquired the event from a correct message queue in step S306, it is determined by the determination on the side of the data source 103 in step S307 that event reacquisition is unnecessary, and the process advances to step S309 without performing step S308. Since this procedure complies with the processing procedure of the data source defined by the TWAIN, the data source correctly operates in combination with the application that operates according to the TWAIN standard.

On the other hand, if the application 101 has acquired the event from an incorrect message queue in step S306, it is determined by the determination on the side of the data source 103 in step S307 that event reacquisition is necessary. In step S308, an event necessary for the operation of the data source 103 is acquired using the OS function. For this reason, the process of step S309 on the side of the data source 103 is normally performed, and the data source 103 correctly operates.

As described above, according to the first embodiment, when the event transmitted from the application impedes the operation of the data source, the event necessary for the operation is acquired from the OS outside the application, and the data source is operated. If the event transmitted from the application is normal, processing is executed according to the normal TWAIN.

More specifically, even when the application side acquires the event to be added to the command "DG_CONTROL/DAT_EVENT/MSG_PROCESSEVENT" according to the TWAIN protocol by an incorrect method, it is possible to reacquire the event on the data source side and operate the data source.

As described above, even when the application transmits an event that is not assumed in the TWAIN to the data source, for example, the data source can reacquire the event necessary for the operation from the OS and normally operate. In addition, by determining and processing whether the event impedes the operation, the data source can normally operate even in combination with an application that operates as a general multithread according to the TWAIN standard.

<Second Embodiment>

In the first embodiment, correction of the TWAIN protocol "DG_CONTROL/DAT_EVENT/MSG_PROCESSEV-ENT" (event reacquisition) is performed on the side of the data source 103. In the second embodiment, however, an arrangement that causes a DSM 102 located between an application 101 and a data source 103 to perform correction (event reacquisition) will be described.

Processing on the side of the application 101 is the same as the flowchart of FIG. 2 according to the first embodiment, and a description thereof will be omitted.

The operation on the side of the data source 103 according to the second embodiment will be described next with reference to the flowchart shown in FIG. 4.

Figure 4:
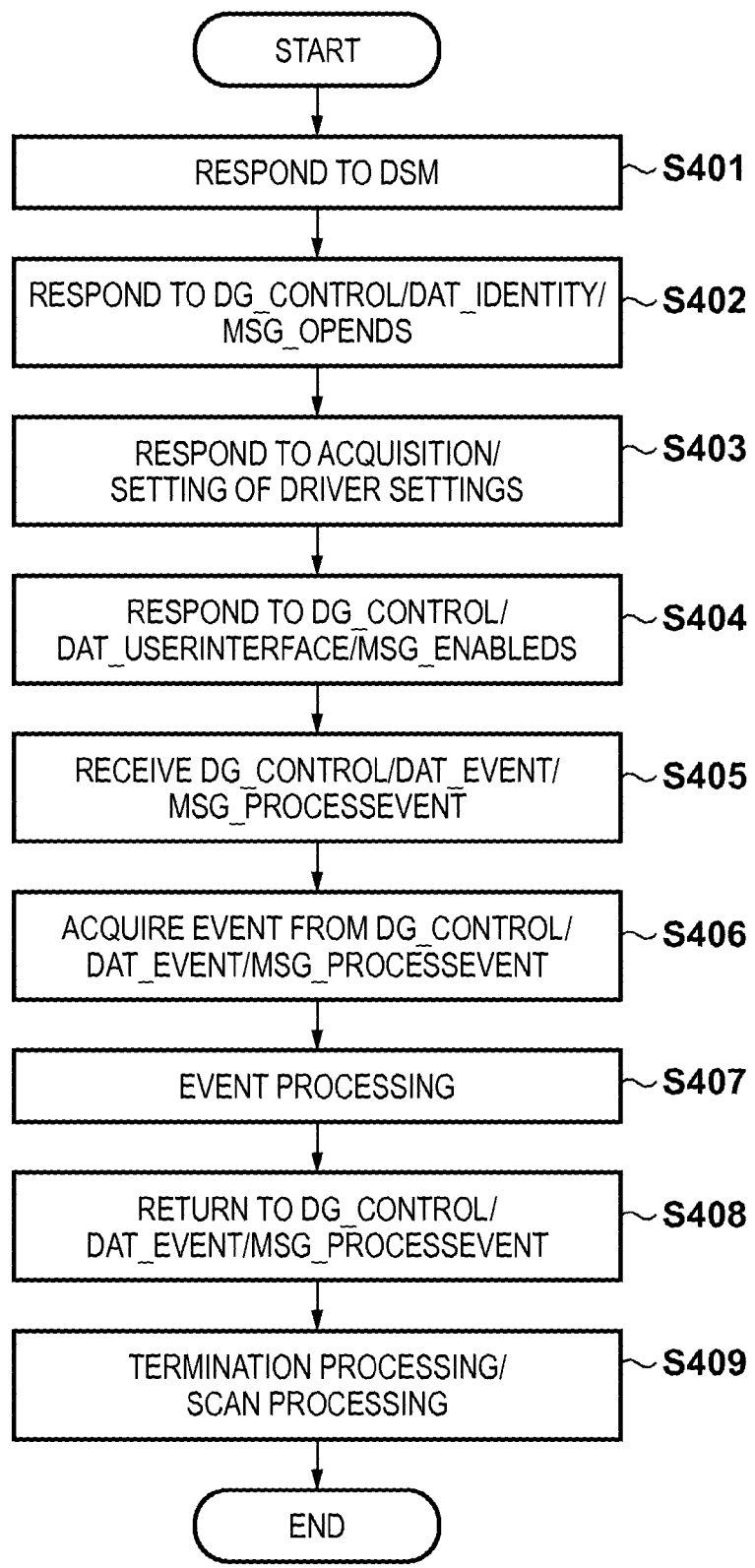
FIG. 4 is a flowchart showing processing on the side of a data source according to the second embodiment.

Steps S401 to S406 of FIG. 4 correspond to steps S301 to S306 of FIG. 3, and a description thereof will be omitted. In addition, steps S407 to S409 correspond to steps S309 to S311 of FIG. 3, and a description thereof will be omitted. That is, the processes of steps S307 and S308 in FIG. 3 are omitted in FIG. 4. In the second embodiment, since the data source 103 can acquire a normal event from the DSM 102, as will be described later, the processes of steps S307 and S308 in FIG. 3 are unnecessary. Additionally, since this procedure is a general procedure defined by TWAIN, any special processing need not be performed on the side of the data source 103.

Figure 5:
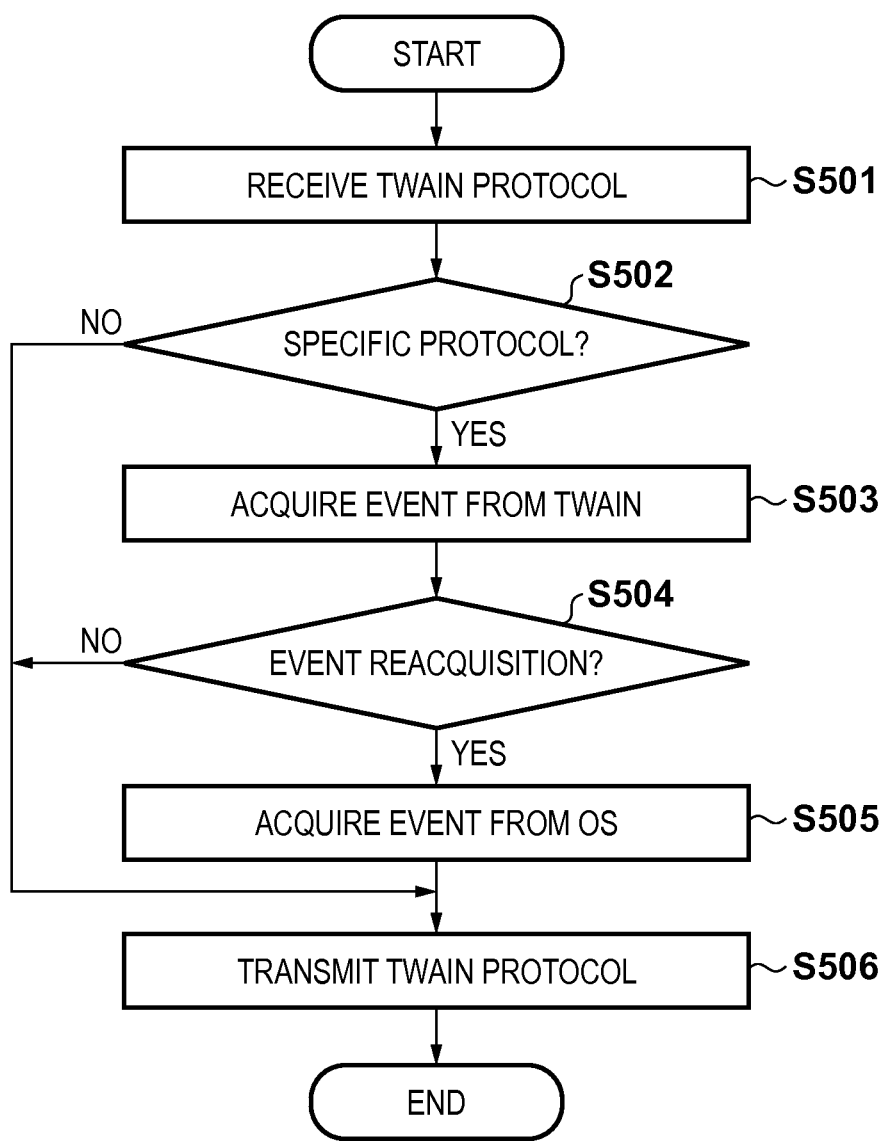
FIG. 5 is a flowchart showing processing on the side of a data source manager according to the second embodiment.

The operation on the side of the DSM 102 according to the second embodiment will be described with reference to the flowchart shown in FIG. 5.

In step S501, the DSM 102 receives a command according to the TWAIN protocol, which is transmitted from the application 101. In step S502, the DSM 102 determines whether the command according to the TWAIN protocol is a specific command ("DG_CONTROL/DAT_EVENT/MSG_PROCESSEVENT"). If the command is not the specific command (NO in step S502), the process advances to step S506. If the command is the specific command (YES in step S502), the process advances to step S503.

In step S503, the DSM 102 acquires the event added to the command "DG_CONTROL/DAT_EVENT/MSG_PROCESSEVENT" according to the TWAIN protocol. In step S504, the DSM 102 determines whether the acquired event needs to be reacquired. As the determination method here, the determination method in step S307 of FIG. 3 can be used.

Upon determining that the event needs to be reacquired (YES in step S504), the process advances to step S505. If no event need be reacquired (NO in step S504), the process advances to step S506.

In step S505, the DSM 102 discards event information added to the command "DG_CONTROL/DAT_EVENT/MSG_PROCESSEVENT" according to the TWAIN protocol, reacquires an event using the OS function, and adds the reacquired event to the command "DG_CONTROL/DAT_EVENT/MSG_PROCESSEVENT" according to the TWAIN protocol. In step S506, the DSM 102 transmits the command "DG_CONTROL/DAT_EVENT/MSG_PROCESSEVENT" according to the TWAIN protocol to the data source 103.

Commands other than the command "DG_CONTROL/DAT_EVENT/MSG_PROCESSEVENT" according to the TWAIN protocol are transmitted to the data source 103 in accordance with the TWAIN standard. Even the command "DG_CONTROL/DAT_EVENT/MSG_PROCESSEV-ENT" according to the TWAIN protocol is transmitted to the data source 103 in accordance with the TWAIN standard if the event added to it need not be reacquired. For this reason, the processing of FIG. 5 correctly operates in combination with the application 101 according to the TWAIN standard. On the other hand, if the event added to the command "DG_CONTROL/DAT_EVENT/MSG_PROCESSEVENT" according to the TWAIN protocol needs to be reacquired, the event that operates the data source 103 is acquired in step S505 and transmitted to the data source 103.

As described above, according to the second embodiment, even when the application side acquires the event to be added to the TWAIN protocol "DG_CONTROL/DAT_EVENT/MSG_PROCESSEVENT" by a method that is not assumed in the TWAIN, the DSM side can reacquire the event and operate the data source. For example, the data source can normally operate even in combination with an application that operates as a multithread.

Note that the above embodiments have been described by exemplifying TWAIN as the API of the application and the data source (device driver). However, the embodiments may be applied to any API other than the TWAIN.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261830, filed Dec. 18, 2013, which is hereby incorporated by reference herein in its entirety.

What is claimed is:

1. An information processing apparatus for operating an application and a driver on an OS (Operating System), comprising:
at least one CPU (Central Processing Unit) coupled to a memory device and programmed to provide:
a receiving unit configured to receive, via a predetermined API (Application Programming Interface), an application event issued by the application;
a determination unit configured to determine whether the driver can handle the received application event; and
a control unit configured to
when the determination unit determines that the driver cannot handle the received application event, discard the received application event, acquire an OS event necessary for an operation of the driver from the OS, and process based on the acquired OS event, and
when the determination unit determines that the driver can handle the received application event, process based on the received application event.

2. The apparatus according to claim 1, wherein the determination unit determines that the driver cannot handle the received application event when a thread in which the application issues the application event and a thread in which the driver acquires the OS event are different.

3. The apparatus according to claim 1, wherein the determination unit acquires a window handle from the received application event, and when the window handle represents an invalid window, determines that the driver cannot handle the received application event.

4. The apparatus according to claim 1, wherein the determination unit and the control unit are implemented by the driver.

5. The apparatus according to claim 1, wherein the API is TWAIN.

6. An information processing method of operating an application and a driver on an OS (Operating System), comprising:
receiving, via a predetermined API (Application Programming Interface), an application event issued by the application;
determining whether the driver can handle the received application event;
when it is determined in the determining that the driver cannot handle the received application event, discarding the received application event, acquiring an OS event necessary for an operation of the driver from the OS, and processing based on the acquired OS event; and
when it is determined in the determining that the driver can handle the received application event, processing based on the received application event.

7. The method according to claim 6, wherein in the determining, it is determined that the driver cannot handle the received application event when a thread in which the application issues the application event and a thread in which the driver acquires the OS event are different.

8. The method according to claim 6, wherein in the determining, a window handle is acquired from the received application event, and it is determined that the driver cannot handle the received application event when the window handle represents an invalid window.

9. The method according to claim 6, wherein the determining, the discarding, the acquiring, the processing based on the acquired OS event, and the processing based on the received application event are implemented by the driver.

10. The method according to claim 6, wherein the API is TWAIN.

11. A non-transitory computer-readable storage medium storing a program that when executed causes a computer to perform an information processing method of operating an application and a driver on an OS (Operating System), the method comprising:
receiving, via a predetermined API (Application Programming Interface), an application event issued by the application;

determining whether the driver can handle the received application event;

when it is determined in the determining that the driver cannot handle the received application event, discarding the received application event, acquiring an OS event necessary for an operation of the driver from the OS, and processing based on the acquired OS event; and when it is determined in the determining that the driver can handle the received application event, processing based on the received application event.

12. The medium according to claim 11, wherein in the determining, it is determined that the driver cannot handle the received application event when a thread in which the application issues the application event and a thread in which the driver acquires the OS event are different.

13. The medium according to claim 11, wherein in the determining a window handle is acquired from the received application event, and it is determined that the driver cannot handle the received application event when the window handle represents an invalid window.

14. The medium according to claim 11, wherein the discarding, the acquiring, the processing based on the acquired OS event, and the processing based on the received application event are implemented by the driver.

15. The medium according to claim 11, wherein the API is TWAIN.

* * * * *